Jan. 4, 1949. A. L. FEILD Re. 23,069
ELECTROLYTIC POLISHING OF STAINLESS STEEL
Original Filed Sept. 30, 1942
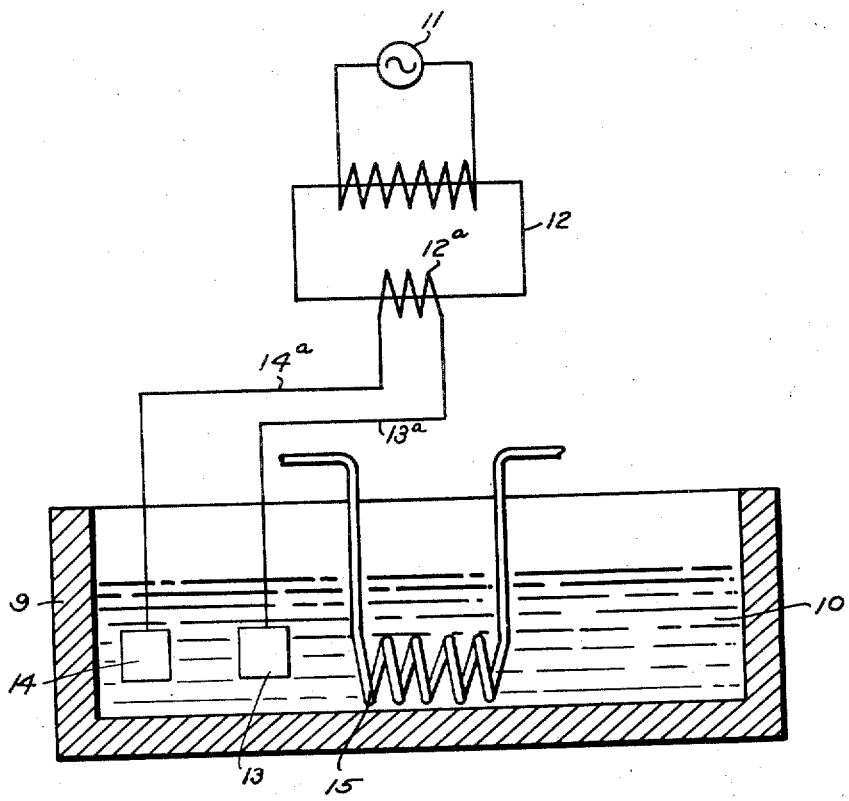
INVENTOR.
ALEXANDER L. FEILD,
BY John Howard Joynt
HIS ATTORNEY Reissued Jan. 4, 1949 Re. 23,069

UNITED STATES PATENT OFFICE 23,069

ELECTROLYTIC POLISHING OF STAINLESS STEEL

Alexander L. Feild, Baltimore, Md., assignor, by mesne assignments, to Armco Steel Corporation, a corporation of Ohio Original No. 2,442,592, dated June 1, 1948, Serial No. 635,451, December 17, 1945, which is a division of Serial No. 460,296, September 30, 1942. Application for reissue September 30, 1948, Serial No. 51,943

5 Claims. (Cl. 204—140)

My application is a division of my copending application Serial No. 460,296 of September 30, 1942, entitled Electrolytic polishing of stainless steel (now Patent Number 2,442,592), and the invention relates to stainless steel and more especially to a process and apparatus for electrolytically polishing the same.

An object of my invention is the provision of a simple, direct and thoroughly reliable process of electrolytically polishing stainless steel, using an alternating electrolyzing current and low current densities.

Another object of my invention is the provision of apparatus for electrolytically polishing stainless steel, which apparatus includes a compact assembly of equipment, which is installed and operated with a minimum of technical advice and skill, which is successfully energized from ordinary alternating current service lines, and which in operation is thoroughly efficient and reliable in achieving highly polished stainless steel products.

Other objects in part will be obvious and in part will be pointed out hereinafter.

The invention accordingly consists in the combination of features and arrangement of parts and in the combination of steps and the relation of each of the same to one or more of the others as described herein, the scope of the application of which is indicated in the following claims.

In the accompanying drawing there is illustrated schematically an electrolytic polishing system for carrying out the practice of my invention.

As conducive to a clearer understanding of certain features of my invention, it may be noted at this point that stainless steel is defined as low-carbon steel comprising 10% to 35% or more chromium, with or without nickel, and with or without supplemental additions of manganese, silicon, cobalt, copper, molybdenum, tungsten, vanadium, columbium, titanium, sulphur, and the like, for special purposes, and a balance substantially of iron.

It may be noted further that stainless steel is characterized in unpolished condition by a dull, grayish appearance. With proper polishing treatment, however, such steel is finished to possess a brilliant, mirror-like surface. There are, for example, certain prior art methods of polishing stainless steel which involve mechanical polishing steps, such as abrading, buffing, and the like. These methods, however, aside from being tedious and time-consuming, require skilled labor and frequent replacement of polishing equipment.

They do not give uniformly polished products and are especially unsatisfactory where peculiar or intricate metal surface contours are encountered.

More recently, processes of finishing stainless steel surfaces have been developed which involve electrolytic polishing. As compared with the still widely used grinding, buffing and like mechanical polishing methods, the electrolytic polishing methods are far more simple, and more rapid and economical of performance. Electrolytically polished products, moreover, possess greater brilliance and improved beauty, there being a greater evenness and uniformity of finish.

The art of electrolytic polishing, on the other hand, being relatively new in the stainless steel industries, still presents a number of difficulties. In this connection, it has been common practice in the heretofore known electrolytic polishing processes to employ direct current electrical energy which, where only alternating current is readily available, represents a problem. It becomes necessary to install expensive batteries or a motor-generating set to supply direct current in the polishing system and thus, in effect, the unit cost of polished steel produced is increased. Again, certain of these heretofore known processes frequently yield products which, because of being etched or discolored, are unsuitable for their originally intended use. Other such processes are not adapted for rapid, large scale production of polished stainless steel products and thus possess no great industrial utility.

An outstanding object of my invention, accordingly, is the provision of an economical, industrially practical process of electrolytically polishing stainless steel wherein the work is evenly polished in an electrolyte solution by means of alternating electric current, which process is rapid of performance, and which gives highly polished products free of discoloration and free of etched or pitted areas.

Referring now more particularly to the practice of my invention, I electrolytically polish articles or products fashioned of stainless steel in the form of sheet, strip, plate, wire, bars, rods, rounds, and the like, using the article or product as one or more alternating current electrodes of an electrolytic bath. The bath itself consists of concentrated nitric acid, with or without a substantial amount of concentrated acetic acid.

As illustrative of the practice of my invention, attention being directed to the drawing, I provide in a suitable container 9, such as an open tank having an acid-resistant metallic lining, an electrolyte solution 10 containing, by volume, for example, 80% to 40% concentrated nitric acid (density 1.40–1.42) and 20% to 60% concentrated acetic acid (glacial acetic acid density 1.048). Within the volume ranges specified, I prefer most especially to employ an acid solution containing approximately 70% concentrated nitric acid and about 30% concentrated acetic acid. Although the presence of concentrated acetic acid in the bath is preferred, the acetic acid serving as a buffer, it is within the scope of my invention to use concentrated nitric acid alone. In so doing, I employ by volume of electrolyte about 80% or more concentrated nitric acid and a balance principally of water.

Alternating current electrical energy conveniently is supplied to the bath by way of a step-down transformer 12 connected across a suitable source of alternating current supply 11. Opposite ends of the transformer secondary winding 12*a* are connected respectively with suitably spaced immersed electrodes 13 and 14 of the bath, as by conductors 13*a* and 14*a*. The electrode 13 is, for example, a plate of acid-resisting metal or the lining of tank 9, while the electrode 14 comprises a stainless steel work piece to be polished.

Upon energization of the transformer, alternating current courses through the concentrated acid electrolyte between the immersed electrodes and polishing of the stainless steel work begins promptly and proceeds rapidly. The polishing operation preferably is performed using a low current density ranging approximately from ½ to 4 amperes per square inch of exposed surface. Such density, however, may be increased, depending on other working conditions up to 12 or more amperes per square inch.

During the polishing operation a considerable amount of heat develops in the electrolytic bath. There is a tendency for the temperature of the bath to increase. This tendency is counteracted by providing suitable cooling means in or adjacent the electrolyte, such as a refrigerator coil generally indicated at 15; or by stirring the electrolyte. Usually I maintain an electrolyte temperature which ranges from −12° C. to +15° C., for it is within this range that I achieve best polishing results and, at the same time, incidentally avoid excessive evaporation of the electrolyte. I find, where solution temperatures extend upwardly of approximately 25° C., the immersed stainless steel work is exposed objectionably to attack and is etched or pitted and, thus, such bath temperatures are to be avoided. The temperature range, therefore, is in every sense critical to the successful operation of my process.

A satisfactory polish ordinarily requires about three minutes time. The work then is withdrawn from the bath and disconnected from the source of supply. It then is rinsed thoroughly in clean water after which it is ready for use or sale. It possesses a mirror-like surface which is evenly polished and highly attractive.

In my process, the actual polishing of the stainless steel is done on the positive half-cycle of the alternating current. The opposite or negative half-cycle of current surprisingly does not destroy the polish. By virtue of this phenomenon the stainless steel work itself may represent either electrode of my polishing system, and be polished with equally as good results. In fact, both electrodes may at the same time be represented by individual stainless steel work pieces. Polishing of the work then is successively achieved in a thoroughly efficient and practical manner at both electrodes.

My electrolyte polishing process is successfully practiced on stainless steel articles and products of widely differing quality and consistently gives uniformly polished stainless steel surfaces even where surfaces of intricate contour are encountered. Where the metal under treatment possesses a hammered surface, such as is often the case of ornamental trim, hardware, and objects of art including bowls and urns, an even lustrous polish nevertheless is obtained. Other surfaces of intricate contour such as those encountered on stainless steel grilles, trays, and the like, fabricated by the welding of wire, strip or other converted forms, also are polished successfully. The polished surfaces achieved are free of pits or blemishes and the welded portions likewise are free of burns, thus resisting corrosion and maintaining their attractiveness over a long period of time.

The electrolytic polishing process which I provide is, moreover, rapid and economical of performance and is quite adaptable to continuous or mass production of polished stainless steel products of outstanding quality. The equipment needed is cheap and readily available, requires little space for installation, and after installation is easily operated and maintained.

Thus, it will be seen that there is provided in this invention a process of electrolytically polishing stainless steel in which the various objects hereinbefore noted together with many thoroughly practical advantages are successfully achieved. It will be noted that the process gives in a simple and economical manner, evenly polished stainless steel products which are free of pits and other surface flaws, and which possess outstanding lustrous beauty. It will be noted further that the process is performed efficiently and reliably through the use of apparatus energized by the readily available alternating electric current.

As many possible embodiments may be made of my invention and as many changes may be made in the embodiments hereinbefore set forth, it is to be understood that all matter described herein or shown in the accompanying drawing is to be interpreted as illustrative and not as a limitation.

I claim:

1. The art of electro-polishing a stainless steel product which comprises, immersing the product to be polished in a bath containing by volume 80% or more of concentrated aqueous nitric acid (sp. gr. 1.40–1.42) and the remainder being water, and while maintaining the bath at a temperature below 25° C., passing only alternating current through said bath between the product and a cooperating electrode immersed therein, the current density being at least ½ amperes per square inch of product surface.

2. The art of electro-polishing a stainless steel product which comprises, immersing the product to be polished in a bath containing by volume 80% or more of concentrated aqueous nitric acid (sp. gr. 1.40–1.42) and the remainder being water, and while maintaining the bath at a temperature −12° C. to +15° C., passing only alternating current through said bath between the product and a cooperating electrode immersed therein, the current density being at least ½ amperes per square inch of product surface.

3. The art of electro-polishing a chromium-nickel stainless steel product which comprises, immersing the product to be polished in a bath containing by volume 80% or more of concentrated aqueous nitric acid (sp. gr. 1.40–1.42) and the remainder being water, and while maintaining the bath at a temperature below 25° C., passing only alternating current through said bath between the product and a cooperating electrode immersed therein, the current density being at least ½ to 12 amperes per square inch of product surface.

4. The art of electro-polishing stainless steel products which comprises, immersing two stainless steel products to be polished in a bath containing by volume 80% or more of concentrated aqueous nitric acid (sp. gr. 1.40–1.42) and the remainder water, and passing only alternating current through said bath and between said products at a current density of at least ½ amperes per square inch of surface of each product while maintaining the bath temperature below 25° C.

5. The art of electro-polishing a stainless steel product which comprises, immersing the product to be polished in a bath containing by volume 80% concentrated aqueous nitric acid (sp. gr. 1.40–1.42) and the remainder water, and while maintaining the bath at a temperature below 25° C., passing only alternating current through said bath between the product and a cooperating electrode immersed therein, the current density being about ½ to 4 amperes per square inch of product surface.

ALEXANDER L. FEILD.

REFERENCES CITED

The following references are of record in the file of this patent:

UNITED STATES PATENTS

| Number | Name | Date |
|---|---|---|
| 2,040,618 | Mason | May 12, 1936 |
| 2,424,674 | White | July 29, 1947 |

FOREIGN PATENTS

| Number | Country | Date |
|---|---|---|
| 530,041 | Great Britain | Dec. 4, 1940 |